(12) United States Patent
Jin

(10) Patent No.: US 9,897,742 B2
(45) Date of Patent: Feb. 20, 2018

(54) BACKLIGHT UNIT AND LIQUID CRYSTAL DISPLAY DEVICE INCLUDING THE SAME

(71) Applicant: LG Display Co., Ltd., Seoul (KR)

(72) Inventor: JaeHyun Jin, Seoul (KR)

(73) Assignee: LG Display Co., Ltd., Seoul (KR)

(\*) Notice: Subject to any disclaimer, the term of this patent is extended or adjusted under 35 U.S.C. 154(b) by 27 days.

(21) Appl. No.: 14/963,450

(22) Filed: Dec. 9, 2015

(65) Prior Publication Data

US 2016/0170130 A1 Jun. 16, 2016

(30) Foreign Application Priority Data

Dec. 10, 2014 (KR) .................. 10-2014-0177791

(51) Int. Cl.
*G02F 1/1335* (2006.01)
*F21V 8/00* (2006.01)
*B32B 7/12* (2006.01)
*C09J 7/02* (2006.01)

(52) U.S. Cl.
CPC ............. *G02B 6/0055* (2013.01); *B32B 7/12* (2013.01); *C09J 7/0296* (2013.01); *G02F 1/133603* (2013.01); *G02F 1/133605* (2013.01); *G02F 1/133608* (2013.01); *G02F 1/133615* (2013.01); *C09J 2201/122* (2013.01); *C09J 2203/318* (2013.01)

(58) Field of Classification Search
CPC ........... G02F 1/33615; G02F 1/133608; G02F 1/133603; G02F 1/133605; G02B 6/0055
See application file for complete search history.

(56) References Cited

U.S. PATENT DOCUMENTS

| 2010/0110334 A1\* | 5/2010 | Oki | G02F 1/133615 349/62 |
| 2011/0007242 A1\* | 1/2011 | Lee | G02F 1/133608 349/65 |
| 2014/0240639 A1\* | 8/2014 | Jung | G02F 1/133308 349/60 |

\* cited by examiner

*Primary Examiner* — Kendrick Hsu
(74) *Attorney, Agent, or Firm* — Morgan, Lewis & Bockius LLP

(57) ABSTRACT

Provided is a backlight unit in which a light blocking film is attached between a reflective sheet and a circuit board of a light source unit to shield a space between the reflective sheet and the circuit board, thus suppressing the reflective sheet from being stripped and minimizing light leakage. The backlight unit includes the light source unit, a light guide plate, the reflective sheet, and the light blocking film.

11 Claims, 4 Drawing Sheets

BACKLIGHT UNIT AND LIQUID CRYSTAL DISPLAY DEVICE INCLUDING THE SAME

CROSS-REFERENCE TO RELATED APPLICATIONS

Pursuant to 35 U.S.C. § 119(a), this application claims the benefit of earlier filing date and right of priority to Korean Application No. 10-2014-0177791, filed on Dec. 10, 2014, the contents of which is incorporated by reference herein in its entirety.

BACKGROUND ART

1. Field of Technology

The present disclosure relates to a backlight unit and, more particularly, to a backlight unit capable of suppressing light leakage due to separation of a reflective sheet, and a liquid crystal display device including the same.

2. Background of the Related Art

A liquid crystal display (LCD) device is a light transmitting type display device which displays an image using optical properties of liquid crystal. Thus, the LCD device includes a backlight unit providing light to a liquid crystal panel. The backlight unit is classified into a direct type backlight unit and an edge type backlight unit depending on the position of the light source.

In order to enhance characteristics of light emitted from a light source, for example, luminance uniformity, maximum luminance, and the like, the backlight unit of the LCD device includes an optical sheet including a prism sheet, or the like.

FIG. 1 is a cross-sectional view of a related art LCD device.

As illustrated in FIG. 1, the related art LCD device includes a backlight unit 10 for providing light to a liquid crystal panel.

The backlight unit 10 includes a light source unit 5, a light guide plate 1, an optical sheet 6, and a reflective sheet 7.

The light source unit 5 includes a light source 2 and a circuit board 3. The light source 2 includes a plurality of light emitting diodes (LEDs), and the plurality of LEDs are arranged to be mounted on the circuit board 3.

The light guide plate 1 is disposed to be adjacent to the light source 2. The light guide plate 1 reflects the light output from the light source 2 to thus transfer and output such light via an upper surface thereof.

The optical sheet 6 is disposed on the light guide plate 1. The optical sheet 6 includes a prism sheet 6a and a protective sheet 6b. The prism sheet 6a collects light emitted from an upper surface of the light guide plate 1 and diffuses the collected light to provide the same to the liquid crystal panel. The protective sheet 6b is disposed between the prism sheet 6a and the light guide plate 1 to protect the prism sheet 6a from being damaged by the light guide plate 1.

The reflective sheet 7 is disposed on a rear surface of the light guide plate 1. The reflective sheet 7 reflects light leaked to the rear surface of the light guide plate 1 back to an upper surface of the light guide plate 1.

The light source unit 5, the light guide plate 1, the optical sheet 7, and the reflective sheet 6 are accommodated by a guide panel 8 and fixed therein. A light blocking tape 9 attached from a portion of an upper surface of the optical sheet to an upper end of a side wall of the guide panel 8, light output from the light source 2 is light shielded from being leaked to a region other than the liquid crystal panel.

Meanwhile, the optical sheet 6 of the backlight unit is formed by stacking two prism sheets in order to reduce the thickness of the backlight unit 10 and suppress generation of certain types of defects, such as creation of sheet creases and so-called Newton ring effects. Here, a space between the light blocking tape 9 and the light source 2 of the light source unit 5 is narrowed, and thus, a structure in which the circuit board 3 of the light source unit 5 is positioned on the rear surface of the light guide plate 1 is used.

Also, in the related art backlight unit 10, in order to additionally reduce the thickness, a container for accommodating the components of the backlight unit 10, for example, a bottom cover is omitted.

According to this structure, in the related art backlight unit 10, the reflective sheet 7 is attached to cover substantially the entire rear surface of the light guide plate 1 and a portion of a rear surface of the circuit board 3 of the light source unit 5, and a guide panel 8 supports both side portions of the reflective sheet 7.

Here, due to a difference between the thickness of the reflective sheet 7 and the thickness of the circuit board 3, a step A (or uneven portion) is formed when the reflective sheet 7 is attached. The step A may cause the reflective sheet 7 is being peeled-off (or separated) from the rear surface of the light guide plate 1, and the separation of the reflective sheet 7 causes certain problems, such as light leakage issues, displaying of dark spots, and the like, with respect to the backlight unit 10.

SUMMARY OF THE INVENTION

Accordingly, the present invention is directed to a backlight unit and a liquid crystal display device including the same that substantially obviate one or more of the problems due to limitations and disadvantages of the related art.

An object of the present invention is to provide a backlight unit in which a reflective sheet is suppressed from being peeled-off, thus reducing a defect such as light leakage, or the like, and a liquid crystal display (LCD) device including the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight unit may comprise a light source unit including a circuit board and a plurality of light sources mounted on the circuit board; a light guide plate disposed to be adjacent to the light source unit; a reflective sheet attached to a rear surface of the light guide plate and disposed to be parallel to the circuit board such that an end of the reflective sheet is spaced apart from an end of the circuit board; and a light blocking film attached to cover a rear surface of the circuit board and a portion of a rear surface of the reflective sheet, and configured to shield light leaked through the space between the circuit board and the reflective sheet.

In another aspect, a liquid crystal display (LCD) device may comprise a liquid crystal panel; and a backlight unit disposed below the liquid crystal panel and configured to provide light to the liquid crystal panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the present disclosure. In the drawings.

DETAILED DESCRIPTION OF THE INVENTION

Hereinafter, a backlight unit and a liquid crystal display (LCD) device including the same based on exemplary embodiments of the invention will be described in detail with reference to the accompanying drawings.

Figure 1:
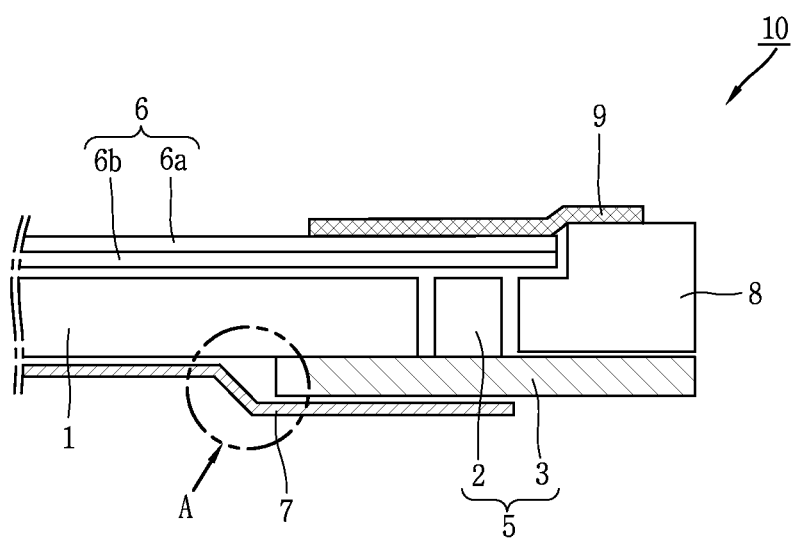
FIG. 1 is a cross-sectional view illustrating a related art liquid crystal display (LCD) device.
Figure 2:
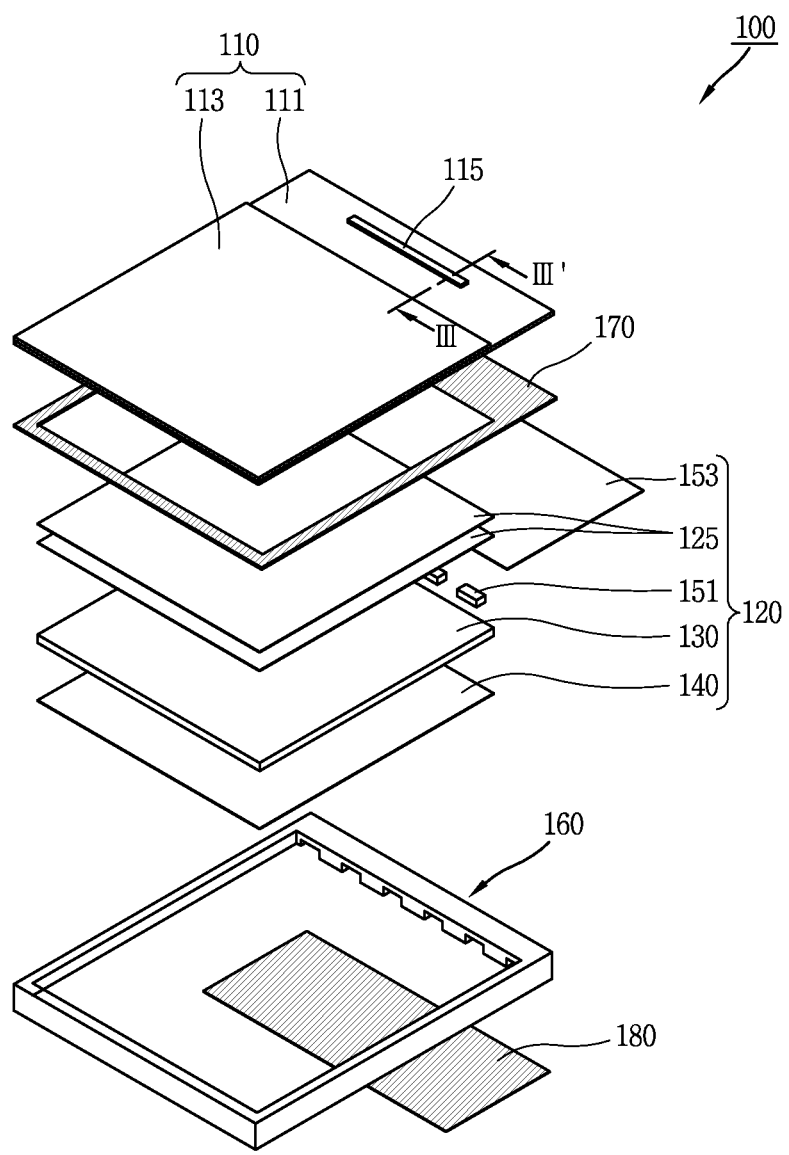
FIG. 2 is an exploded perspective view of an LCD device according to an example embodiment of the present disclosure.
Figure 3:
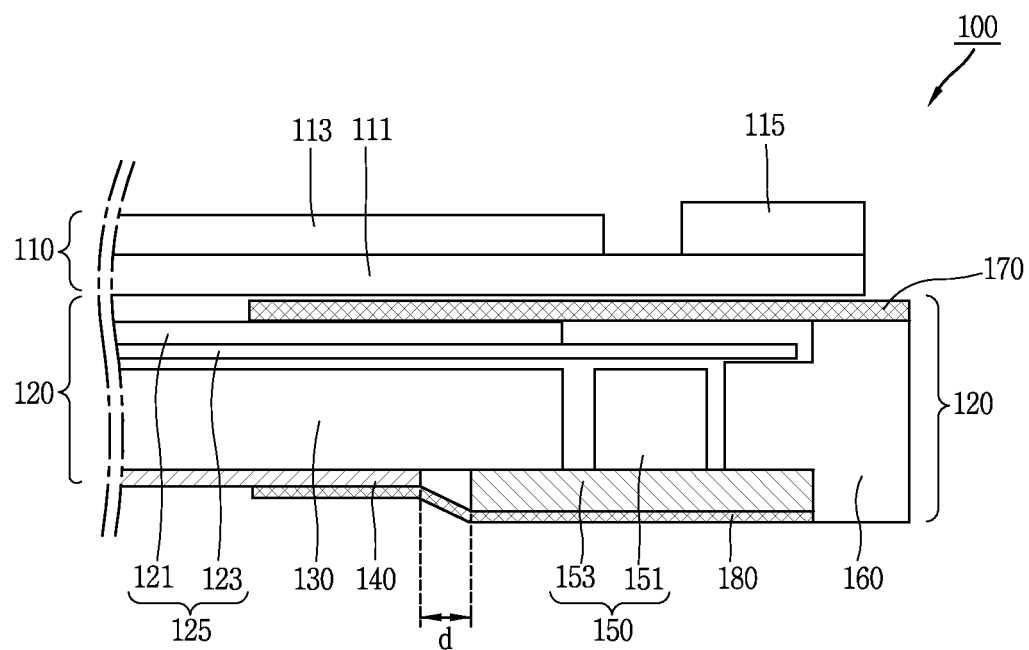
FIG. 3 is a cross-sectional view of the LCD device of FIG. 2, taken along line III-III'.

FIG. 2 is an exploded perspective view of an LCD device according to an example embodiment of the present disclosure, and FIG. 3 is a cross-sectional view of the LCD device of FIG. 2, taken along line III-III'.

Referring to FIGS. 2 and 3, an LCD device 100 according to this embodiment may include a liquid crystal panel 110 and a back light unit 120.

The liquid crystal panel 110 may include an array substrate 111 and a color filter substrate 113 attached such that a cell-gap is maintained with a liquid crystal layer interposed therebetween.

The array substrate 111 may include a plurality of gate lines and a plurality of data lines formed to intersect each other. Pixels are defined at or near the intersections of the gate lines and the data lines, and a thin film transistor (TFT) is provided in each of the pixels and connected to a pixel electrode.

The color filter substrate 113 may include color filters of R, G, and B colors corresponding to the pixels, and a black matrix surrounding each of the color filters and covering the gate lines, the data lines, and the TFTs of the array substrate 111. Also, the color filter substrate 113 may further include a common electrode covering the color filters and the black matrix.

A driver 115 may be mounted on one side of the liquid crystal panel 110, for example, on one side of the array substrate 111. The driver 115 may generate a driving signal for driving the liquid crystal panel 110 in response to an external signal. The driving signal may be supplied to the gate lines and the data lines of the array substrate 111 to generate an electric field between the pixel electrode and the common electrode.

The backlight unit 120 may be disposed below the liquid crystal panel 110 and provide light to the liquid crystal panel 110. The backlight unit 120 may include a light source unit 150, a light guide plate 130, an optical sheet 125, and a reflective sheet 140. The components of the backlight unit 120 may be accommodated within a guide panel 160 and fixed therein.

The light source unit 150 may include a light source 151 and a circuit board 153.

The light source 151 may be configured as a light emitting diode (LED). A plurality of light sources 151 may be mounted to be spaced apart from one another on an upper surface of the circuit board 153.

The circuit board 153 may be configured as a flexible printed circuit board (FPCB), and may include a wiring pattern formed on a plastic film such as polyethylene terephthalate (PET) or polyimide, a flexible material.

The circuit board 153 may be disposed to be parallel to a reflective sheet 140 (to be described hereinafter) on a rear surface of the light guide plate 130. One side of an upper surface of the circuit board 153 may be connected to a rear surface of the light guide plate 130 and the other side thereof may be in contact with a lower portion of the guide panel 160.

The light guide plate 130 may be disposed to be adjacent to the light source unit 150 and emits light provided from the light sources 151 through an upper surface thereof. The light guide plate 130 may internally reflect light therein and passes the light via the upper surface thereof. Referring to FIG. 3, the light guide plate 130 may have a plate shape or may have a wedge shape in which a portion thereof adjacent to the light sources 151 is thicker than other portions thereof.

The optical sheet 125 is disposed on an upper surface of the light guide plate 130. The optical sheet 125 may diffuse and collect light emitted through the upper surface of the light guide plate 130 and provide the light to the liquid crystal panel 110.

The optical sheet 125 may include one or more prism sheets 121 and a protective sheet 123. In this embodiment, in order to reduce a thickness of the optical sheet 125, a single prism sheet 121 formed by combining two prism sheets and a protective sheet 123.

For example, the prism sheet 121 may be formed by combining a diffusing sheet diffusing light and a collecting sheet collecting light, an such a prism sheet 121 may diffuse and collect light provided from the light guide plate 130.

The protective sheet 123 is disposed between the prism sheet 121 and the light guide plate 130, and protects the prism sheet 121 from being damaged by the light guide plate 130. The protective sheet 123 may be formed to extend to an upper portion of a side wall of a lower end of the guide panel 160.

A first light blocking film 170 may be attached to an upper surface of the optical sheet 125. The first light blocking film 170 may extend from the upper portion of the side wall of the upper end of the guide panel 160 to an upper surface of the optical sheet 125 so as to be attached. An adhesive is applied to at least one or both surfaces of the first light blocking film 170 to fix the liquid crystal panel 110 and the backlight unit 120. The first light blocking film 170 may be formed of black (or other appropriate) colored material to absorb light output from the backlight unit 120 from being leaked outwardly or from being leaked to the edge of the liquid crystal panel 110.

The reflective sheet 140 may be attached to a rear surface of the light guide plate 130 so as to be disposed. The reflective sheet 140 may reflect light leaked through the rear surface of the light guide plate 130, to an upper surface of the light guide plate 130.

The reflective sheet 140 may be disposed to be parallel to the circuit board 153 of the light source unit 150. Ends of the reflective sheet 140 and the circuit board 153 may maintain a specific space d therebetween in consideration of attachment tolerance.

Also, the reflective sheet 140 may have a thickness smaller than that of the circuit board 153 of the light source unit 150. Thus, the reflective sheet 140 and the circuit board 153 may have a step in height.

The guide panel 160 may have a quadrangular frame shape including a stair shape side wall, that is, upper and lower end side walls. The guide panel 160 may accommodate the light source unit 150, the light guide plate 130, the optical sheet 150, and the reflective sheet 140 and fix them therein.

A second light blocking film 180 may be attached to a rear surface of the circuit board 153 and a portion of the rear surface of the reflective sheet 140. The second light blocking film 180 may extend from the rear surface of the circuit board 153 to one side of the rear surface of the reflective sheet 140 so as to be attached.

Figure 4:
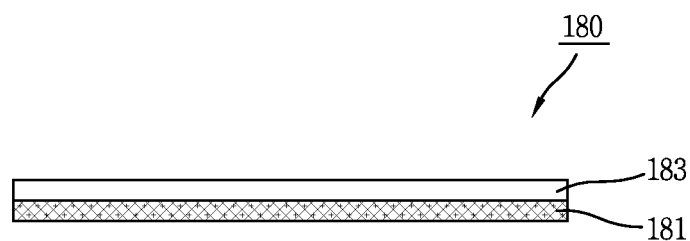
FIG. 4 is a cross-sectional view of a second light blocking film illustrated in FIG. 2.

FIG. 4 is a cross-sectional view of the second light blocking film illustrated in FIG. 2.

Referring to FIG. 4, the second light blocking film 180 may include a base film 181 and an adhesive layer 183.

The base film 181 may be formed of a black polyethylene terephthalate (PET) material.

The adhesive layer 183 may be applied to the entirety of one surface of the base film 181. The adhesive layer 183 may be formed as a double-sided tape.

The second blocking film 180 may further include an anti-static electricity layer for reducing static electricity. The anti-static electricity layer may be coated on one surface of the base film 181, namely, between the adhesive layer 183 and the one surface of the base film 181, or may be coated on the other surface of the base film 181. The anti-static electricity layer may be formed by mixing an opaque conductive metal material with a resin and coating the mixture.

Referring back to FIGS. 2 and 3, the second light blocking film 180 may fix the circuit board 153 of the light source unit 150 and one side of the reflective sheet 140. The second light blocking film 180 may shield leakage of light through a region exposed due to the space d between the end of the circuit board 153 and the end of the reflective sheet 140, namely, through a portion of the rear surface of the light guide plate 130.

Also, the second light blocking film 180 may have a thickness smaller than those of the reflective sheet 140 and the circuit board 153. In other words, since the second light blocking film 180 has a small thickness, it is more flexible than the reflective sheet 140 and the circuit board 153. Thus, even though the step (or uneven surface portion) is formed between the end of the reflective sheet 140 and the end of the circuit board 153 due to a difference in the thickness between the reflective sheet 140 and the circuit board 153, since the second light blocking film 180 attached to the reflective sheet 140 and the circuit board 153 has high flexibility, the second light blocking film 180 does not peel-off (or become detached from) the reflective sheet 140 or the circuit board 153.

As described above, in the backlight unit of this embodiment, the second light blocking film 180 may be attached to shield the space (d) on the rear surface of the reflective sheet 140 and the rear surface of the circuit board 153 of the light source unit 150 spaced apart from one another by a specific space (d) and disposed to be parallel to each other on the rear surface of the light guide plate 130.

Thus, even though the reflective sheet 140 does not cover the rear surface of the circuit board 153 such as in the related art, since the second light blocking film 180 is attached to the rear surface of the reflective sheet 140 and the rear surface of the circuit board 153, light leaked to the rear surface of the light guide plate 130 exposed between the reflective sheet 140 and the circuit board 153 may be shielded or effectively blocked. Also, since the second light blocking film 180 has a thickness smaller than those of the reflective sheet 140 and the circuit board 153, having high flexibility, even though a step is formed in height due to the difference in thickness between the reflective sheet 140 and the circuit board 153, a phenomenon in which the second light blocking film 180 is stripped (or becomes detached) from the rear surface of the reflective sheet 140 or the circuit board 153 can be suppressed.

Figure 5:
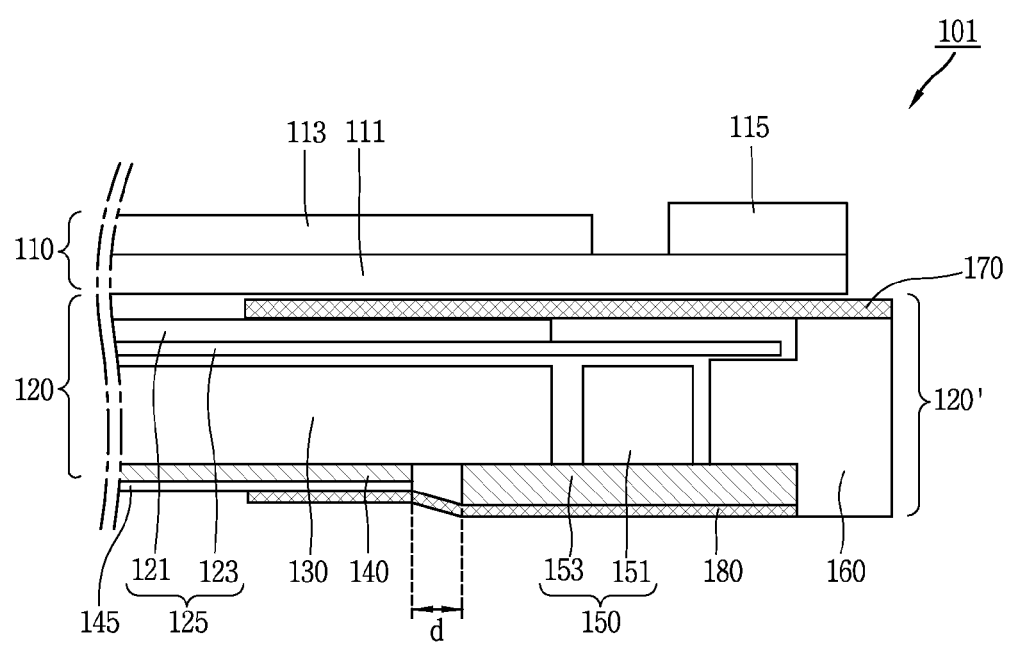
FIG. 5 is a cross-sectional view of an LCD device according to another example embodiment of the present disclosure.

FIG. 5 is a cross-sectional view of an LCD device according to another example embodiment of the present disclosure.

An LCD device 101 illustrated in FIG. 5 is substantially the same as the LCD device 100 according to the embodiment described above with reference to FIGS. 2 and 3, except for the configuration in which a protective film 145 is attached to a rear surface of the reflective sheet 140. Thus, the same reference numerals are used for the same elements and a detailed description thereof will be omitted merely for avoiding redundancy.

Referring to FIG. 5, the LCD device 101 according to this embodiment may include a liquid crystal panel 110 and a back light unit 120'.

The backlight unit 120' may be disposed below the liquid crystal panel 110 and provides light to the liquid crystal panel 110. The backlight unit 120' may include a light source unit 150, a light guide plate 130, an optical sheet 125, and a reflective sheet 140. These components may be accommodated within a guide panel 160 and fixed therein.

The light source unit 150 may include light sources 151 configured as a plurality of LEDs and a circuit board 153 on which the light sources 151 are mounted to be spaced apart from one another on an upper surface thereof. The circuit board 153 may be spaced apart from the reflective sheet 140 by a specific space on a rear surface of the light guide plate 130 and disposed to be parallel to the reflective sheet 140.

The light guide plate 130 may be disposed to be adjacent to the light source unit 150 and directs the light provided from the light sources 151 through an upper surface thereof.

The optical sheet 125 may be disposed on an upper surface of the light guide plate 130. The optical sheet 125 may diffuse and collect light provided through the upper surface of the light guide plate 130 and provide the light to the liquid crystal panel 110. The optical sheet 125 may include at least one prism sheet 121 and at least one protective sheet 123.

A first light blocking film 170 may be attached to an upper surface of the optical sheet 125 to shield or block leakage of light. The light blocking film 170 may extend from an upper portion of a side wall of an upper end of the guide panel 160 to an upper surface of the optical sheet 125 so as to be attached.

The reflective sheet 140 may be attached to a rear surface of the light guide plate 130 and reflect light leaked through the rear surface of the light guide plate 130, to an upper surface of the light guide plate 130. The reflective sheet 140 may be disposed to be spaced apart from the circuit board 153 of the light source unit 150 by a specific space in consideration of attachment tolerance and disposed to be parallel to the circuit board 153.

Also, a protective film 145 may be attached to the rear surface of the reflective sheet 140, that is, to the other surface of the reflective sheet 140 opposing one surface thereof attached to the light guide plate 130, in order to protect the reflective sheet 140. The protective film 145 may be attached to cover substantially the entire rear surface of the reflective sheet 140.

A second light blocking film 180 may be attached to a rear surface of the circuit board 153 and a portion of the rear surface of the reflective sheet 140. The second light blocking film 180 may extend from the rear surface of the circuit board 153 to one side of the rear surface of the protective film 145 so as to be attached.

An adhesive layer may be formed on one surface of the second light blocking film 180, and the circuit board 153 of the light source unit 150 and one side of the protective film 145 may be fixed by the adhesive layer. The second light blocking film 180 may shield leakage of light through a region exposed due to the space (d) between the end of the circuit board 153 and the end of the reflective sheet 140 or the protective film 145.

Meanwhile, due to the protective film 145 attached to the rear surface of the reflective sheet 140, a difference in thickness between the reflective sheet 140 and the protective film 145 and the circuit board 153 may not be significant. Thus, a step or uneven portion is rarely formed between the end of the reflective sheet 140 and the end of the circuit board 153 in the second light blocking film 180. Thus, the second light blocking film 180 does not peel-off or become detached.

As described above, in the backlight unit 120' of this embodiment, since the protective film 145 is attached to the rear surface of the reflective sheet 140 to reduce a difference in the thickness between the reflective sheet 140, the protective film 145 and the circuit board 153, formation of a step in the second light blocking film 180 may be minimized. Also, even though the reflective sheet 140 does not cover the rear surface of the circuit board 153, light leaked to the rear surface of the light guide plate 130 can be shielded by the second light blocking film 180.

A backlight unit according to some embodiments of the present disclosure may include a light source unit including a circuit board and a plurality of light sources mounted on the circuit board, a light guide plate adjacent to the light source unit, a reflective sheet at a rear surface of the light guide plate and parallel to the circuit board such that an end of the reflective sheet is spaced apart from an end of the circuit board and a light blocking film covering a rear surface of the circuit board and a portion of a rear surface of the reflective sheet, and configured to shield light leaked through a space between the circuit board and the reflective sheet.

The light blocking film may include a black base film and an adhesive layer on the entirety of one surface of the black base film. The light blocking film has a thickness smaller than that of the reflective sheet.

The backlight unit may include a protective film covering a rear surface of the reflective sheet. The light blocking film covers the rear surface of the circuit board and a portion of the rear surface of the protective film.

The backlight unit may include at least one optical sheet on an upper surface of the light guide plate, a guide panel configured to accommodate the light source unit, the light guide plate, the reflective sheet, and the optical sheet and a second light blocking film covering an upper end of a side wall of the guide panel and a portion of an upper surface of the optical sheet.

A liquid crystal display device according to some embodiments of the present disclosure may include a liquid crystal panel and a backlight unit disposed below the liquid crystal panel and configured to provide light to the liquid crystal panel, wherein the backlight unit includes a light source unit including a circuit board and a plurality of light sources mounted on the circuit board, a light guide plate disposed to be adjacent to the light source unit, a reflective sheet attached to a rear surface of the light guide plate and disposed to be parallel to the circuit board such that an end of the reflective sheet is spaced apart from an end of the circuit board and a light blocking film attached to cover a rear surface of the circuit board and a portion of a rear surface of the reflective sheet, and configured to shield light leaked through the space between the circuit board and the reflective sheet.

The light blocking film comprises a black base film and an adhesive layer on the entirety of one surface of the black base film. The black base film and the adhesive layer together configured to have sufficient flexibility to cover a step or uneven portion at a boundary between the circuit board and the reflective sheet, and also to block light leakage at said step or uneven portion. The light blocking film has a thickness smaller than that of the reflective sheet.

A film according to some embodiments of the present disclosure may include a base layer having a certain thickness and made of a material having sufficient light blocking properties and an adhesive layer having a certain thickness with an outer surface having characteristics that allow adhesion to an inner surface of the base layer and an inner surface having characteristics that allow adhesion to an outer surface of a circuit board at one region thereof and adhesion to a reflective sheet at another region thereof, the base layer and the adhesive layer together configured to have sufficient flexibility to cover a step or uneven portion at a boundary between the circuit board and the reflective sheet, and also to block light leakage at said step or uneven portion.

The base layer is attached to an entirety of the outer surface of the circuit board via the adhesive layer. A total thickness of the base layer and the adhesive layer combined together is less than a thickness of the reflective sheet that is part of a display device. An outer surface of the base layer is flush with a guide panel at an edge of the display device. A protective film exists between the adhesive layer and the reflective sheet.

In accordance with the backlight unit of example embodiments of the present invention, since the light blocking film is attached between the reflective sheet and the circuit board of the light source unit to shield a space between the reflective sheet and the circuit board, the reflective sheet is suppressed from being stripped or light leakage may be reduced.

It will be apparent to those skilled in the art that various modifications and variations can be made in the a backlight unit and a liquid crystal display device including the same of the present invention without departing from the spirit or scope of the invention. Thus, it is intended that the present invention cover the modifications and variations of this invention provided they come within the scope of the appended claims and their equivalents.

What is claimed is:
1. A backlight unit, comprising:
 a light source unit including a circuit board and a plurality of light sources mounted on the circuit board;
 a light guide plate adjacent to the light source unit;

a reflective sheet at a rear surface of the light guide plate and parallel to the circuit board such that an end of the reflective sheet is spaced apart from an end of the circuit board; and a light blocking film covering a rear surface of the circuit board and a portion of a rear surface of the reflective sheet, and configured to shield light leaked through a space between the circuit board and the reflective sheet, wherein the light blocking film comprises:
  a black base film; and
  an adhesive layer on the entirety of one surface of the black base film.

2. The backlight unit of claim 1, wherein the light blocking film has a thickness smaller than that of the reflective sheet.

3. The backlight unit of claim 1, further comprising:
a protective film covering a rear surface of the reflective sheet.

4. The backlight unit of claim 3, wherein the light blocking film covers the rear surface of the circuit board and a portion of the rear surface of the protective film.

5. The backlight unit of claim 1, further comprising:
at least one optical sheet on an upper surface of the light guide plate;
a guide panel configured to accommodate the light source unit, the light guide plate, the reflective sheet, and the optical sheet; and
a second light blocking film covering an upper end of a side wall of the guide panel and a portion of an upper surface of the optical sheet.

6. The backlight unit of claim 1, wherein the black base film and the adhesive layer together are configured to have sufficient flexibility to cover a step or uneven portion at a boundary between the circuit board and the reflective sheet, and also to block light leakage at said step or uneven portion.

7. The backlight unit of claim 1, wherein the black base film is attached to an entirety of the outer surface of the circuit board via the adhesive layer.

8. A liquid crystal display (LCD) device, comprising:
a liquid crystal panel; and
a backlight unit disposed below the liquid crystal panel and configured to provide light to the liquid crystal panel,
wherein the backlight unit comprises:
a light source unit including a circuit board and a plurality of light sources mounted on the circuit board;
a light guide plate disposed to be adjacent to the light source unit;
a reflective sheet attached to a rear surface of the light guide plate and disposed to be parallel to the circuit board such that an end of the reflective sheet is spaced apart from an end of the circuit board; and
a light blocking film attached to cover a rear surface of the circuit board and a portion of a rear surface of the reflective sheet, and configured to shield light leaked through the space between the circuit board and the reflective sheet,
wherein the light blocking film comprises:
  a black base film; and
  an adhesive layer on the entirety of one surface of the black base film.

9. The LCD device of claim 8, wherein the black base film and the adhesive layer together configured to have sufficient flexibility to cover a step or uneven portion at a boundary between the circuit board and the reflective sheet, and also to block light leakage at said step or uneven portion.

10. The LCD device of claim 9, wherein the light blocking film has a thickness smaller than that of the reflective sheet.

11. The LCD device of claim 8, further comprising:
a protective film covering a rear surface of the reflective sheet, wherein the light blocking film covers the rear surface of the circuit board and a portion of the rear surface of the protective film.

* * * * *